US009012792B2

(12) United States Patent
Gui

(10) Patent No.: US 9,012,792 B2
(45) Date of Patent: Apr. 21, 2015

(54) PIN MOUNTING FOR TENSION WEIGHING MODULE WHERE THE MIDDLE PORTION OF THE PINS HAVE ARC-SHAPPED RETRACTABLE NECKS THAT COUPLE WITH CONVEX SHAPED PORTIONS OF THROUGH HOLES IN THE SENSING BODY

(75) Inventor: Yong Gui, Hangzhou (CN)

(73) Assignee: Youngzon Transducer (Hangzhou) Co., Ltd., Hangzhou, Zhejiang Province (CN)

( * ) Notice: Subject to any disclaimer, the term of this patent is extended or adjusted under 35 U.S.C. 154(b) by 387 days.

(21) Appl. No.: 13/512,987

(22) PCT Filed: Dec. 31, 2010

(86) PCT No.: PCT/CN2010/080586
§ 371 (c)(1),
(2), (4) Date: May 31, 2012

(87) PCT Pub. No.: WO2011/143921
PCT Pub. Date: Nov. 24, 2011

(65) Prior Publication Data
US 2012/0234611 A1    Sep. 20, 2012

(30) Foreign Application Priority Data

May 17, 2010 (CN) .................... 2010 2 0193215 U

(51) Int. Cl.
*G01G 21/28*    (2006.01)
*G01G 3/00*     (2006.01)
(Continued)

(52) U.S. Cl.
CPC .............. *G01G 3/12* (2013.01); *G01G 21/163* (2013.01); *G01G 21/184* (2013.01); *Y10S 177/09* (2013.01)

(58) Field of Classification Search
USPC ............. 177/211, 238, 239, 244, DIG. 9, 201
See application file for complete search history.

(56) References Cited

U.S. PATENT DOCUMENTS 3,797,593 A * 3/1974 Conley .......................... 177/134
4,280,576 A * 7/1981 Smith, Jr. ...................... 177/126
(Continued)

FOREIGN PATENT DOCUMENTS

CN    2263338 Y    9/1997
CN    2306978 Y    2/1999
(Continued)

*Primary Examiner* — Randy W Gibson
(74) *Attorney, Agent, or Firm* — Jacobson Holman PLLC; Jiwen Chen

(57) ABSTRACT

A pull-type weighing module comprises a pull-type sensing body (1,210), a base plate (2,220), a pressure seat, a first pin (4,420), and a second pin (5,250), wherein the first pin (4,420) is parallel with the second pin (5,250). A left bracket (21,221) and a right bracket (22,222) are set on the base plate (2,220), and the first pin (4,240) is supported on the left bracket (21,221) and the right bracket (22,222). The left bracket (21, 221) and the right bracket (22,222) are provided on the left side and the right side of the sensing body (1,210) respectively. A left supporting arm (31,231) and a right supporting arm (32,232) are set on the pressure seat, and the second pin (5,250) is supported on the left supporting arm (31,231) and the right supporting arm (32,232). The left supporting arm (31,231) and the right supporting arm (32,232) are provided on the left and right side of the sensing body (1,210) respectively. A first through-hole (11,211), which the first pin (4,240) passes through, is provided on the upper part of the sensing body (1,210). A second through-hole (12,212), which the second pin (5,250) passes through, is provided on the lower part of the sensing body (1,210).

7 Claims, 2 Drawing Sheets

(51) Int. Cl.
*G01G 3/12* (2006.01)
*G01G 21/06* (2006.01)
*G01G 21/16* (2006.01)
*G01G 21/18* (2006.01)

(56) References Cited

U.S. PATENT DOCUMENTS 4,475,610 A * 10/1984 Schwarzschild .............. 177/211
4,516,645 A * 5/1985 Wetzel .......................... 177/147
4,627,507 A * 12/1986 Powell et al. ................. 177/211
6,177,639 B1 * 1/2001 Feilner .......................... 177/134

FOREIGN PATENT DOCUMENTS

| | | |
|---|---|---|
| CN | 201421359 Y | 3/2010 |
| GB | 1485320 A | 7/1977 |

\* cited by examiner

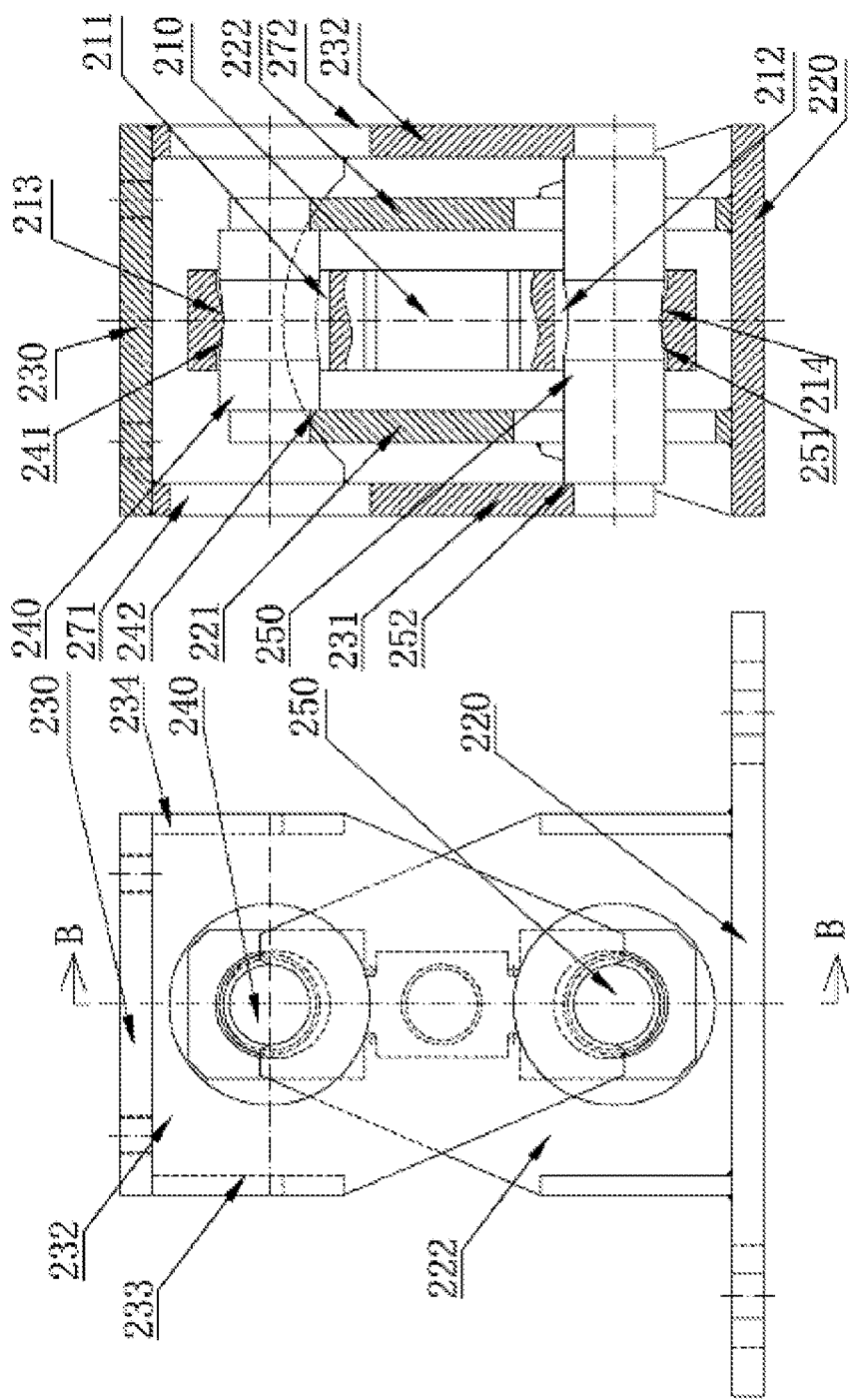

PIN MOUNTING FOR TENSION WEIGHING MODULE WHERE THE MIDDLE PORTION OF THE PINS HAVE ARC-SHAPPED RETRACTABLE NECKS THAT COUPLE WITH CONVEX SHAPED PORTIONS OF THROUGH HOLES IN THE SENSING BODY

This is a U.S. national stage application of PCT Application No. PCT/CN2010/080586 under 35 U.S.C. 371, filed Dec. 31, 2010 in Chinese, claiming the priority benefit of Chinese Application No. 201020193215.7, filed May 17, 2010, which are hereby incorporated by reference.

FIELD OF THE INVENTION

The present invention relates to a pull-type weighing module.

BACKGROUND OF THE INVENTION

Conventionally, weighing modules comprising pull-type sensors available on the market are mainly threadedly fixed. They are inconvenient to assemble and disassemble. In addition, those weighing modules have low test accuracy because tests are conducted through only the pulling force. When the sensors and the weighing modules undergo an overload pulling force, they would break and bring damages to equipment or cause harm to personnel.

SUMMARY OF THE INVENTION

In view of the above-described problems, it is one object of the present invention to provide a pull-type weighing module, having a simple structure, high test accuracy and great reliability. To achieve the aforesaid object, in accordance with the present invention, there is provided a pull-type weighing module, comprising a pull-type elastic sensing body, a base plate, a pressure seat, a first pin and a second pin, wherein the first pin is parallel with the second pin.

A left bracket and a right bracket are set on the base plate and the first pin is supported on the left bracket and the right bracket. The left bracket and the right bracket are provided on the left side and the right side of the elastic sensing body, respectively. A first through-hole, which the first pin passes through, is provided on an upper part of the elastic sensing body.

The pressure seat includes a bearing plate, a left supporting arm and a right supporting arm, wherein the left supporting arm and the right supporting arm are connected with the bearing plate and disposed on the left and right sides of the elastic sensing body, respectively. The bearing plate is disposed above the elastic sensing body, which has a second through-hole disposed under the first through-hole. The second pin passes through the elastic sensing body via the second through-hole and the left supporting arm and the right supporting arm are supported on the second pin.

The pressure seat is swingable as there are gaps disposed among the left and the right brackets, the left and the right supporting arms, the elastic sensing body, and the first and the second pins.

When the technical solution provided herein is adopted, the weighing module provides the pressing force rather than the pulling force for the pull-type sensor, thus the utmost weighing safety, great accuracy and excellent repeatability are achieved.

BRIEF DESCRIPTION OF THE DRAWINGS

FIG. 3 is a front view of the implementation example 2 of the present invention; and FIG. 4 is a sectional view of FIG. 3 taken along line B-B.

DETAILED DESCRIPTION OF THE EMBODIMENTS

Figures 1, 2:
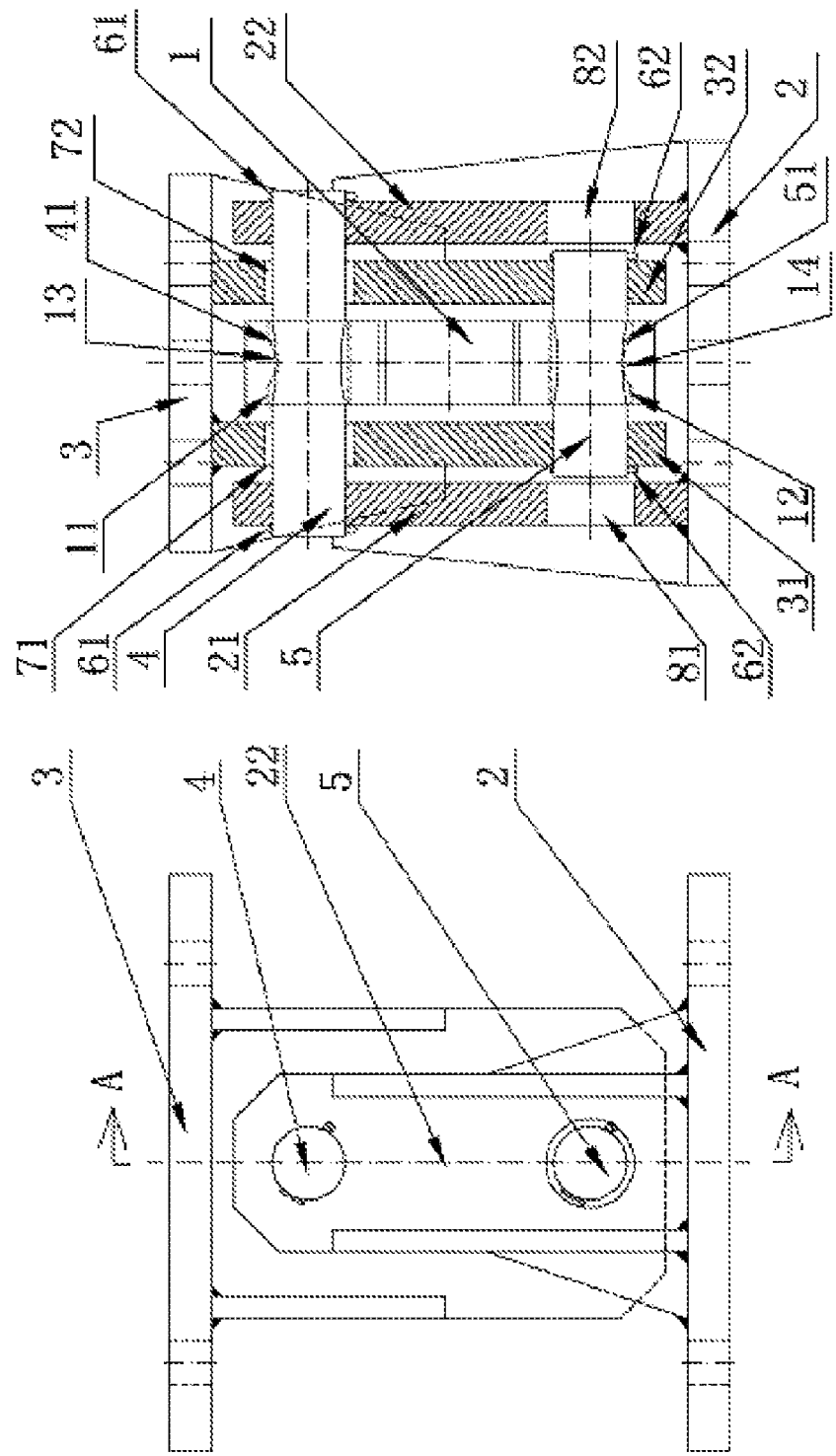
FIG. 1 is a front view of the implementation example 1 of the present invention.
FIG. 2 is a sectional view of FIG. 1 taken along line A-A.

Example 1 is described in further detail with reference to FIGS. 1 and 2.

A pull-type weighing module, in accordance with the present invention, comprises a pull-type elastic sensing body 1, a base plate 2, a pressure seat, a first pin 4 and a second pin 5, wherein the first pin is parallel with the second pin.

A left bracket 21 and a right bracket 22 are set on the base plate 2, and the first pin 4 is supported on the left bracket 21 and the right bracket 22. The left bracket and the right bracket are provided on the left side and the right side of the elastic sensing body, respectively. A first through-hole 11, which the first pin 4 passes through, is provided on the upper part of the sensing body 1.

The pressure seat includes a bearing plate 3, a left supporting arm 31 and a right supporting arm 32, wherein the left supporting arm 31 and the right supporting arm 32 are connected with the bearing plate and disposed on the left and right sides of the elastic sensing body 1, respectively. The bearing plate 3 is disposed above the elastic sensing body 1, which has a second through-hole 12 disposed under the first through-hole. The second pin passes through the elastic sensing body via the second through-hole and the left supporting arm and the right supporting arm are supported on the second pin.

The pressure seat is swingable as there are gaps disposed among the left and the right brackets, the left and the right supporting arms, the elastic sensing body, and the first and the second pins.

Apart from the supporting relationship between the first pin and the left bracket 21, the right bracket 22 and the elastic sensing body 1, and between the second pin and the left supporting arm and the right supporting arm, they should also ensure that the pressure seat is swingable. In accordance with this example, there are gaps disposed between a first shaft and the first though-hole as well as between a second shaft and the second though-hole. Therefore the pressure seat can either swing perpendicularly to the first pin and the second pin or swing along the axial direction of the second pin. Further, the first pin, the left bracket and the right bracket are positioned in the axial direction of the first pin while the second pin, the left supporting arm and the right supporting arm are positioned in the axial direction of the second pin. The middle portions of the first pin and the second pin are respectively disposed with arc-shaped retractable necks 41, 51. The pulled portion on the wall of the first though-hole and the pressed portion on the wall of the second though-hole are in convex shapes 13, 14 that fit with the arc-shaped retractable necks. In this way, both the pressure seat and the elastic sensing body are swingable and automatically restorable to their original positions, thereby the accuracy and repeatability of the weighing module reach to the highest. In this example, the first pin passes through the respective holes on the left bracket 21 and the right bracket 22 and meanwhile it is axially positioned by circlips 61. The second pin passes through respective holes on the left supporting arm and the right supporting arm and meanwhile it is axially positioned by circlips 62.

In this example, the left supporting arm and the right supporting arm are respectively located in the inner sides of the left bracket and the right bracket and the elastic sensing body is in the middle. The elastic sensing body is securely protected and thus unlikely to be damaged. The left supporting arm and the right supporting arm are disposed with through-holes 71, 72, which the first pin passes through. The gap formed between the first pin and the through-holes 71, 72 allows the pressure seat to swing within a given range. The through-holes 71, 72 cooperate with the first pin to serve as a limiting structure to restrict the swinging range of the pressure seat perpendicular to the first and the second pins. The distance of the gaps among the left and the right brackets, the left and the right supporting arms, and the elastic sensing body also serve as the limiting structure to restrict the swinging range of the pressure seat in the axial direction of the first and the second pins.

At the positions of the left and the right brackets corresponding to the second pin are respectively disposed with apertures 81, 82 that are larger than the diameter of the second pin.

The left and right sides of the pull-type weighing module are symmetrical relative to the arc-shaped retractable necks.

In this example, the pressure seat is connected with the second pin while the first pin is connected with the base plate. Therefore, after assembly, the weighing module becomes integrated as a whole and will not fall apart when the pressure seat is pulled up. Alternatively, the left supporting arm and the right supporting arm can be designed to be located at the outer sides of the left and the right brackets, respectively.

Example 2 is described in further detail with reference to FIGS. 3 and 4.

A pull-type weighing module, in accordance with the present invention, comprises a pull-type elastic sensing body 210, a base plate 220, a pressure seat, a first pin 240 and a second pin 250.

A left bracket 221 and a right bracket 222 are set on the base plate 220, and the first pin 240 is supported on the left bracket 221 and the right bracket 222. The left bracket and the right bracket are provided on the left side and the right side of the elastic sensing body, respectively. A first through-hole 211, which the first pin 240 passes through, is provided on the upper part of the elastic sensing body 210.

The pressure seat includes a bearing plate 230, a left supporting arm 231 and a right supporting arm 232, wherein the left supporting arm 231 and the right supporting arm 232 are connected with the bearing plate and disposed on the left and the right sides of the elastic sensing body 210, respectively. The bearing plate 230 is disposed above the elastic sensing body 210, which has a second through-hole 212 disposed under the first through-hole. The second pin passes through the elastic sensing body via the second through-hole and the left supporting arm and the right supporting arm are supported on the second pin.

The pressure seat is swingable as there are gaps disposed among the left and the right brackets, the left and the right supporting arms, the elastic sensing body, and the first and the second pins.

Apart from the supporting relationship between the first pin and the left bracket 221, the right bracket 222 and the elastic sensing body 210, and between the second pin and the left supporting arm and the right supporting arm, they should also ensure that the pressure seat is swingable. In accordance with this example, there are gaps disposed between a first shaft and the first though-hole as well as between a second shaft and the second though-hole, therefore the pressure seat can either swing perpendicularly to the first pin and the second pin or swing along the axial direction of the second pin. Further, the first pin, the left bracket and the right bracket are positioned in the axial direction of the first pin while the second pin, the left supporting arm and the right supporting arm are positioned in the axial direction of the second pin. The middle portions of the first pin and the second pin are respectively disposed with arc-shaped retractable necks 241, 251. The pulled portion on the wall of the first though-hole and the pressed portion on the wall of the second though-hole are in convex shapes 213, 214 that fit with the arc-shaped retractable necks. In this way, both the pressure seat and the elastic sensing body are swingable and automatically restorable to their original positions, thereby the accuracy and repeatability of the weighing module reach to the highest. In addition, if abrasion occurs to the first pin and the second pin, their life span will be prolonged at least four times by rotating them. In this example, the first pin is disposed on the left bracket and the right bracket while the left supporting arm and the right supporting arm are disposed on the second pin. Therefore, it is convenient to assemble and disassemble the pull-type weighing module. In accordance with this example, the first pin, the left bracket 221 and the right bracket 222 are axially positioned via a convex shoulder 242 on the first pin while the second pin, the left supporting arm and the right supporting arm are axially positioned via a convex shoulder 252 on the second pin.

In this example, the left supporting arm and the right supporting arm are respectively located in the outer sides of the left bracket and the right bracket and the elastic sensing body is in the middle. The elastic sensing body is securely protected and thus unlikely to be damaged. At the positions of the left supporting arm and the right supporting arm corresponding to the first pin are respectively disposed with apertures 271, 272 that are larger than the diameter of the first pin. The apertures are used for inspection and repair at any time.

At the both sides of the bearing plate 230 are disposed with a rear baffle 233 and a front baffle 234, which cooperate with the left bracket 221 and the right bracket 222 to serve as a limiting structure to restrict the swinging range of the pressure seat perpendicular to the first and the second pins. The distance of the gaps among the left and the right brackets, the left and the right supporting arms, and the elastic sensing body also serve as the limiting structure to restrict the swinging range of the pressure seat in the axial direction of the first and the second pins.

The left and right sides of the pull-type weighing module are symmetrical relative to the arc-shaped retractable necks.

In this example, all the elements are built up like toy bricks. Therefore, it is highly convenient for assembly and maintenance. Moreover, the pressure seat, the sensor and the pins can be easily pulled up for separation. Alternatively, the left supporting arm and the right supporting arm in this example can be designed to be located in the inner sides of the left and the right brackets.

The invention claimed is:

1. A weighing module for measuring pulling force, comprising an elastic sensing body for measuring pulling force, characterized in that said weighing module is disposed with a base plate, a pressure seat, a first pin and a second pin, wherein the first pin and the second pin are parallel and in a same plane;

a left bracket and a right bracket are set on the base plate, and the first pin is supported on the left bracket and the right bracket; the left bracket and the right bracket are respectively provided on left side and right side of the elastic sensing body; a first through-hole, through which the first pin passes, is provided on an upper part of the sensing body;

the pressure seat comprises a bearing plate, a left supporting arm and a right supporting arm, wherein the left supporting arm and the right supporting arm are connected with the bearing plate and disposed on the left and the right sides of the elastic sensing body, respectively; the bearing plate is disposed above the elastic sensing body, which has a second through-hole disposed under the first through-hole; the second pin passes through the elastic sensing body via the second through-hole and the left supporting arm and the right supporting arm are supported on the second pin; and the pressure seat is swingable as there are gaps disposed among the left and the right brackets, the left and the right supporting arms, the elastic sensing body, and the first and the second pins;

wherein the first pin, the left bracket and the right bracket are positioned in an axial direction of the first pin while the second pin, the left supporting arm and the right supporting arm are positioned in an axial direction of the second pin; and wherein the first pin passes through the left bracket and the right bracket or is disposed on the left bracket and the right bracket, the second pin passes through the left supporting arm and the right supporting arm or the left supporting arm and the right supporting arm are disposed on the second pin, middle portions of the first pin and the second pin are respectively disposed with arc-shaped retractable necks, and a pulled portion on a wall of the first though-hole and a pressed portion on a wall of the second though-hole are in convex shapes that fit with the arc-shaped retractable necks.

2. The weighing module according to claim 1, wherein there are gaps disposed between the first through-hole and the first pin as well as between the second through-hole and the second pin.

3. The weighing module according to claim 1, wherein left and right sides of said weighing module are symmetrical relative to the arc-shaped retractable necks.

4. The weighing module according to claim 1, wherein the left supporting arm and the right supporting arm are respectively located at outer sides of the left and the right brackets; at positions of the left and the right brackets corresponding to the first pin are respectively disposed with apertures that are larger than the diameter of the first pin.

5. The weighing module according to claim 4, wherein the left and right sides of said weighing module are symmetrical relative to the arc-shaped retractable necks.

6. The weighing module according to claim 1, wherein the left supporting arm and the right supporting arm are respectively located in inner sides of the left bracket and the right bracket and disposed with through-holes; the through holes, through which the first pin passes, form a gap with the first pin in between to allows the pressure seat to swing within a given range; at the positions of the left and the right brackets corresponding to the second pin are respectively disposed with apertures that are larger than the diameter of the second pin.

7. The weighing module according to the claim 6, wherein the left and right sides of said weighing module are symmetrical relative to the arc-shaped retractable necks.

* * * * *